United States Patent
Jahn et al.

(10) Patent No.: US 10,677,508 B2
(45) Date of Patent: Jun. 9, 2020

(54) METHOD FOR OPERATING A COOLING UNIT AND COOLING UNIT CONFIGURATION FOR AN AIRCRAFT

(71) Applicant: DIEHL AVIATION GILCHING GMBH, Gilching (DE)

(72) Inventors: Alexander Jahn, Dresden (DE); Ingo Zerbes, Munich (DE); Jan Boris Philipp, Munich (DE)

(73) Assignee: Diehl Aviation Gilching GmbH, Gilching (DE)

( * ) Notice: Subject to any disclaimer, the term of this patent is extended or adjusted under 35 U.S.C. 154(b) by 92 days.

(21) Appl. No.: 15/968,812

(22) Filed: May 2, 2018

(65) Prior Publication Data
US 2018/0347890 A1  Dec. 6, 2018

(30) Foreign Application Priority Data
Jun. 2, 2017 (DE) .......................... 10 2017 005 298

(51) Int. Cl.
*F25D 21/14* (2006.01)
*B64D 11/04* (2006.01)
*F25D 21/00* (2006.01)

(52) U.S. Cl.
CPC .............. *F25D 21/14* (2013.01); *B64D 11/04* (2013.01); *F25D 21/006* (2013.01)

(58) Field of Classification Search
CPC ........ F25D 21/14; F25D 21/006; B64D 11/04
See application file for complete search history.

(56) References Cited

U.S. PATENT DOCUMENTS

| | | | |
|---|---|---|---|
| 6,845,627 B1 | 1/2005 | Buck | |
| 7,231,778 B2 * | 6/2007 | Rigney | .............. B60H 1/00014 62/407 |
| 8,480,028 B2 | 7/2013 | Kelnhofer | |
| 2013/0048264 A1 | 2/2013 | Lu et al. | |
| 2014/0326005 A1 | 11/2014 | Zywiak et al. | |
| 2015/0065024 A1 * | 3/2015 | Moran | .............. B64D 11/0007 454/74 |
| 2015/0313356 A1 | 11/2015 | Burgess et al. | |

(Continued)

FOREIGN PATENT DOCUMENTS

| | | |
|---|---|---|
| DE | 102015200111 A1 | 7/2016 |
| EP | 2074028 B1 | 12/2010 |
| EP | 1700068 B1 | 9/2015 |

*Primary Examiner* — Elizabeth J Martin
(74) *Attorney, Agent, or Firm* — Laurence A. Greenberg; Werner H. Stemer; Ralph E. Locher

(57) ABSTRACT

A method for operating a cooling unit on board an aircraft includes operating the cooling unit in a cooling mode and in a thawing mode. In the thawing mode, any thawed water in the cooling unit is drained off from a thawing element with the aid of gravitational force, and the thawing mode is prevented during specifiable flight phases and/or flight attitudes of the aircraft. A cooling unit configuration for an aircraft includes a cooling unit to be mounted on board an aircraft. The cooling unit can be operated in a cooling mode and in a thawing mode. The cooling unit has an element that thaws in the thawing mode, from which any thawed water can be drained off with the aid of gravitational force. A control device is configured to prevent the thawing mode during specifiable flight phases and/or flight attitudes of the aircraft.

13 Claims, 5 Drawing Sheets

(56) References Cited

U.S. PATENT DOCUMENTS

2016/0093124 A1* 3/2016 Shi .................... B64D 47/08
                                                    701/2
2016/0200441 A1   7/2016 Truemper et al.

* cited by examiner

METHOD FOR OPERATING A COOLING UNIT AND COOLING UNIT CONFIGURATION FOR AN AIRCRAFT

CROSS-REFERENCE TO RELATED APPLICATION

This application claims the priority, under 35 U.S.C. § 119, of German Patent Application DE 10 2017 005 298.0, filed Jun. 2, 2017; the prior application is herewith incorporated by reference in its entirety.

BACKGROUND OF THE INVENTION

Field of the Invention

The invention relates to a method for operating a cooling unit on board an aircraft and to a cooling unit configuration for an aircraft.

The conventional practice for cooling aircraft galleys is to use cooling units which supply a cold air volume flow at a temperature of less than zero degrees Celsius. During that process, the air humidity leads to icing of the heat exchanger of the cooling unit and thus to a reduction in the cooling capacity provided. Accordingly, a deicing cycle must be carried out, during which thawed water is formed and must be discharged separately in an appropriate fashion.

The thawed water is generally discharged by using various types of thawed-water discharge and collecting devices with an integrated gradient, using the gravitational force, in regular deicing cycles.

German Patent Application DE 10 2015 200 111 A1, corresponding to U.S. Patent Application 2016/0200441, discloses a cooling system on board an aircraft, having a heat exchanger. The cooling system has a normal mode and a deicing mode.

SUMMARY OF THE INVENTION

It is accordingly an object of the invention to provide a method for operating a cooling unit and a cooling unit configuration for an aircraft, which overcome the hereinafore-mentioned disadvantages of the heretofore-known methods and devices of this general type and which specify improvements in relation to cooling units of this kind.

With the foregoing and other objects in view there is provided, in accordance with the invention, a method for operating a cooling unit on board an aircraft, wherein the cooling unit can be operated in a cooling mode and in a thawing mode, in the thawing mode, any thawed water in the cooling unit is drained off from a thawing element with the aid of gravitational force, and the thawing mode is prevented during specifiable flight phases and/or flight attitudes of the aircraft.

The cooling unit can be operated both in a cooling mode and in a thawing mode. In other words, the cooling unit is operated in the cooling mode or the thawing mode when it is not switched off. In the thawing mode, any thawed water ("any" means the case in which thawed water forms) in the cooling unit is drained off or should ideally be drained off from a thawing element with the aid of gravitational force. For this purpose, however, the gravitational force must act in a particular or planned direction, but this is dependent on the position of the cooling unit in space or relative to the direction of the gravitational force. The thawing mode is prevented during specifiable flight phases and/or flight attitudes of the aircraft. In the present case, based on an accelerated aircraft, "gravitational force" or the direction thereof should be understood to mean the gravitational force resulting from the pull of the earth or the acceleration due to the earth and from the acceleration of the aircraft or the direction thereof.

Preventing the thawing mode in the corresponding flight phases and/or flight attitudes prevents thawed water from forming in these flight phases and having to be drained away. In particular, the flight phases chosen are those in which the direction of the gravitational force would be unfavourable with respect to the element or thawing process and the thawed water would thus move or fail to move in the cooling unit in an unwanted way due to the action of the gravitational force.

The flight attitude is known especially through the roll, pitch and yaw angle of the aircraft.

Clearly, the thawing mode is thus allowed only when there are flight phases and/or flight attitudes in which the direction of the gravitational force is favorable for the thawing process and corresponding gravitational guidance of the thawed water. "Allowed" means that it is possible in this case to switch back and forth between the cooling mode and the thawing mode in an arbitrary or, for example, in a conventional timed manner.

It is assumed in this case that the flight attitude of the aircraft is also known at least within permitted tolerances in certain flight phases. Flight phases are, for example, "starting," "ascent," "descent" and "landing." Moreover, if the position of the cooling unit in the aircraft is known, the direction of the gravitational force on the cooling unit is also known from the flight attitude. It is thus possible, in flight phases with an "unfavorable" orientation of the cooling unit relative to the gravitational force, to prevent formation of thawed water and the inadequate drainage thereof.

For example, thawing can be prevented during starting and ascent since the aircraft is normally tilted backwards during this process and thawed water would then flow "rearward" in a cooling unit relative to the flight direction, which is unwanted since there is an outlet for thawed water on the "front side" of the cooling unit.

In a preferred embodiment of the method, the procedure in the cooling mode is as follows: in the cooling unit, air flows through a heat exchanger and is cooled there. In the thawing mode, the heat exchanger is then thawed. In other words, the heat exchanger forms the element which thaws in the thawing mode. Particularly because of the cooling of the air at the heat exchanger, condensed water or thawed water forms thereon, and this has to be discharged in the thawing mode, in particular when the heat exchanger is cold enough, with the result that the condensed water initially freezes in the cooling mode and melts to form thawed water in the thawing mode. The invention is thus suitable for all cooling units for air cooling that have an appropriate heat exchanger.

In a preferred variant of this embodiment, in the cooling mode, the cooling unit supplies air as a cold air flow at a temperature below zero degrees Celsius downstream of the heat exchanger. In the thawing mode, the heat exchanger is deiced as the thawing element, with the possible formation of the thawed water.

In particular, corresponding thawed water is formed by the melting of ice on the corresponding element or the thawing of the element. In particular, such ice is formed by atmospheric moisture condensed on the element in the cooling mode, which is converted into ice. The formation of ice applies especially to a cooling mode in which the prevailing temperatures are below the freezing point of water or condensed atmospheric moisture. The invention is therefore also suitable for cooling units which provide correspondingly low-temperature cold air flows.

In a preferred embodiment, the thawed water in the cooling unit is drained off with the aid of the gravitational force through a collecting channel, which has a current slope angle relative to the horizontal (transversely to the direction of the gravitational force). The shape and alignment of the collecting channel define conditions for the direction of the gravitational force when the thawed water is to be discharged in the intended manner. The thawing mode is suppressed if the current slope angle falls below a minimum angle. "Fall below" means (positively) less than a (positive) limit angle, zero or negative (including limit angles less than or equal to zero).

In this case, the angle is defined with reference particularly to a structural slope angle obtained relative to the horizontal when the cooling unit is in a horizontal alignment, e.g. a desired or basic alignment. The current slope angle is known or can be determined or measured from the flight attitude or flight phase.

In the thawing mode, therefore, the thawed water is intended to flow away through the collecting channel, in particular towards a target point, e.g. a drainage port. This outflow can continue for as long as the gravitational force is moving the thawed water in the planned or desired direction along the collecting channel. This applies for as long as there is a sufficient angle of application for the gravitational force in the correct direction. In particular, the minimum angle can be zero degrees. At smaller slope angles, in particular negative slope angles, the thawed water would then no longer flow along the collecting channel in the desired direction, and this is therefore prevented by suppressing the thawing mode. Thus, a failure to flow out, i.e. the thawed water remaining in the collecting channel, is also avoided.

In a preferred embodiment, the thawed water is drained off through a collecting channel which is part of an air duct. In this case, the air duct is disposed downstream of an evaporator as a heat exchanger of a compression-type refrigerating system. The evaporator is thawed as the element. The integration of a collecting channel into an air duct in a corresponding cooling unit provides a particularly compact cooling unit. Corresponding configurations are conventional, and therefore the invention is also suitable for the conventional configurations.

In a preferred variant of this embodiment, the collecting channel is disposed in a fixed position relative to the aircraft. The current slope angle is then determined from the current flight attitude of the aircraft. Since the direction of the gravitational force can be determined or is known from the flight attitude, and the relative positions of the collecting channel and the aircraft are known, it is also possible to determine the position or angle between the collecting channel and the direction of the gravitational force. Determining the slope angle is therefore particularly simple. The flight attitude—at least in a range of intended flight attitudes—is once again optionally known from the flight phase.

In a preferred variant of this embodiment, the flight attitude is determined by using a flight attitude sensor disposed on the cooling unit in a fixed position relative to the collecting channel. The association between the direction of the gravitational force and the collecting channel and hence the determination of the slope angle can thus be carried out directly at the cooling unit, and it can therefore be accomplished in a particularly accurate and simple manner. Moreover, this is independent of the current installation situation of the cooling unit. In the sense according to the invention, the flight attitude determined by the flight attitude sensor is likewise the "flight attitude of the aircraft."

In a preferred embodiment, the thawing mode is prevented if a roll and/or pitch and/or yaw angle of the flight attitude exceeds a specifiable limit value. In this case, "exceeding" should be taken to be "positive" or "negative" in one of the two directions. In particular, all three angles are zero when the aircraft is flying straight-ahead or is stationary on a flat underlying surface. In this way, particularly simple criteria for suppression of the thawing mode can be achieved.

In a preferred embodiment, the flight attitude is determined from flight attitude data available in the aircraft. For this purpose, in particular, an interface with the on-board electronics of the aircraft is used or required or set up in order to make available the flight attitude data for the method. Thus, there is no need for a separate flight attitude sensor and the method can be implemented in a particularly simple and effective manner in an aircraft.

In a preferred embodiment, the cooling unit is operated in the thawing mode at regular intervals in accordance with regular deicing cycles. "Regular" refers to the case where the thawing mode is not actually being prevented but is being carried out as usual according to regular or cyclical deicing cycles in alternation with the cooling mode. For example, a one-minute thawing phase takes place every 30 minutes. Thus, unhindered regular operation of the cooling unit takes place in all "non-prohibited" flight phases and/or flight attitudes in which the thawing mode would be prevented.

In a preferred embodiment, the cooling unit is operated in the aircraft for cooling purposes in the aircraft galley area. In this case, the cooling unit is, in particular, part of a "galley cooling unit." Thus, the invention is suitable especially also for the widely used and conventional corresponding cooling units for aircraft galleys, in which the above-mentioned icing and thawing problem occurs and is solved by the invention.

With the objects of the invention in view, there is also provided a cooling unit configuration for an aircraft. The cooling unit configuration contains a cooling unit that can be mounted on board an aircraft. The cooling unit can be operated in a cooling mode and in a thawing mode. The cooling unit has an element that thaws in the thawing mode, and any thawed water that forms during this process can be drained off with the aid of gravitational force. The cooling unit configuration contains a control device. The control device is configured to prevent the thawing mode during specifiable flight phases and/or flight attitudes of the aircraft.

The cooling unit configuration and at least some of the embodiments thereof as well as the respective advantages have already been explained analogously in conjunction with the method according to the invention.

In particular, the method according to the invention is carried out with the cooling unit configuration according to the invention, or the cooling unit configuration is set up to carry out the method.

In a preferred embodiment, the cooling unit has a collecting channel, which has a current slope angle relative to the horizontal (transversely to the gravitational force). Through the use of the collecting channel, the thawed water can be drained off with the aid of gravitational force. The control device is configured to suppress the thawing mode if the current slope angle falls below a minimum angle. Once again, "can be drained off" means in the above sense that the gravitational force is oriented in the "correct" direction or an intended direction (or a directional range), that is to say, in particular, that the cooling unit is appropriately aligned.

In a preferred variant of this embodiment, the collecting channel is disposed in a fixed position relative to the aircraft, and the current slope angle is determined from the flight attitude of the aircraft. The cooling configuration contains a flight attitude sensor disposed on the cooling unit in a fixed position relative to the collecting channel. This is used to determine the flight attitude.

In a preferred embodiment, the cooling configuration has an interface. The interface leads to flight attitude data available in the aircraft, or is an interface with such data. The flight attitude can be determined from the flight attitude data.

In a preferred embodiment, the cooling unit configuration is a cooling unit configuration for an aircraft galley area.

The invention is based on the following insights, observations or considerations and also has the following embodiments. Partly by way of simplification, the embodiments are also referred to in this case as "the invention." In this case, the embodiments can also contain or correspond to parts or combinations of the above-mentioned embodiments and/or can optionally also include embodiments which have not heretofore been mentioned.

The invention is based on the insight that the deicing cycles in conventional cooling units in aircraft are carried out independently of the respective flight attitude and/or flight phase of the aircraft. According to the invention, the deicing cycle is suppressed in certain flight phases or flight attitudes, in which a defined aircraft inclination angle is reached or exceeded. This ensures that a sufficiently large gradient for discharge of thawed water is always obtained. The only precondition for this is that the relationships between the flight attitude of the aircraft and the direction of the gravitational force on the cooling units are known.

By taking the aircraft inclination angle into account, it is possible to integrate the thawed-water discharge and collecting devices in an optimized manner in terms of installation space with the same thawed-water separation performance or to improve the thawed-water separation performance with a given installation space.

Therefore, according to the invention, the aircraft inclination is taken into account during a deicing cycle for aircraft galley cooling units in order to optimize the thawed-water separation performance in relation to the installation space.

According to the invention, the aircraft inclination in relation to the installation position of the cooling unit is detected through an interface between the aircraft and the cooling unit or by using a sensor integrated into the cooling unit. When a defined inclination angle is exceeded, a deicing cycle is temporarily suppressed—in particular by using the integrated control system of the cooling unit.

According to the invention, a flight-phase-dependent and/or flight-attitude-dependent defrost of a galley cooling unit is thus obtained. Suppressing defrost cycles in accordance with the aircraft inclination angle serves to optimize thawed-water discharge in the aircraft galley area. According to the invention, there is also complete suppression of the defrost cycle in accordance with the inclination angle measurement about the X, Y and/or Z axis, depending on the installation position of the cooling unit in the aircraft. As an option, there is autonomous inclination angle measurement by using a position sensor integrated into the unit and/or an input signal through an A/C connector.

According to the invention, it is also possible to reduce the air volume flow in defrost cycles in accordance with the inclination angle measurement about the X, Y and/or Z axis, depending on the installation position of the cooling unit in the aircraft, in order to avoid the condensate (thawed water) from being driven out of the element to be thawed (e.g. heat transfer fins) in certain flight phases. A defined air volume flow to drive out the water is required as a driving force due to the surface tension of the condensate droplets. The air volume flow is reduced, for example, by reducing the fan speed and entails acoustic advantages.

According to the invention, it is also possible to adapt the defrost time or defrost threshold, with the result, for example, that the heat exchanger is not necessarily deiced completely. When there is currently a "slight" inclination of a collecting channel relative to the horizontal, for example, it is thus possible for the quantity of condensate that has to be discharged through the collecting channel to be limited in order to ensure a discharge rate that is still adequate in this way. In general, a respective cycle time for the thawing mode is therefore limited, for example, to ensure that the amount of condensate in the form of thawed water which arises in each thawing mode cycle is not too great.

As an alternative or in addition, a threshold value is defined and adapted in order to trigger a thawing mode. Thus, this can be carried out not only at regular time intervals in a time-controlled manner but, for example, also in response to a measured value, e.g. a measured layer thickness of ice on the heat exchanger, a measured flow rate of cooled air per unit time, the air temperature of the cooled air, etc. All of this allows conclusions to be drawn about an ice coating on the heat exchanger or the quantity of ice present and thus about the required thawing operations, for example.

Thus, a defrost does not have to be suppressed completely but need only be reduced. For example, it is also possible for a deicing process to be carried out when required instead of a cyclical deicing process.

Other features which are considered as characteristic for the invention are set forth in the appended claims.

Although the invention is illustrated and described herein as embodied in a method for operating a cooling unit and a cooling unit configuration for an aircraft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
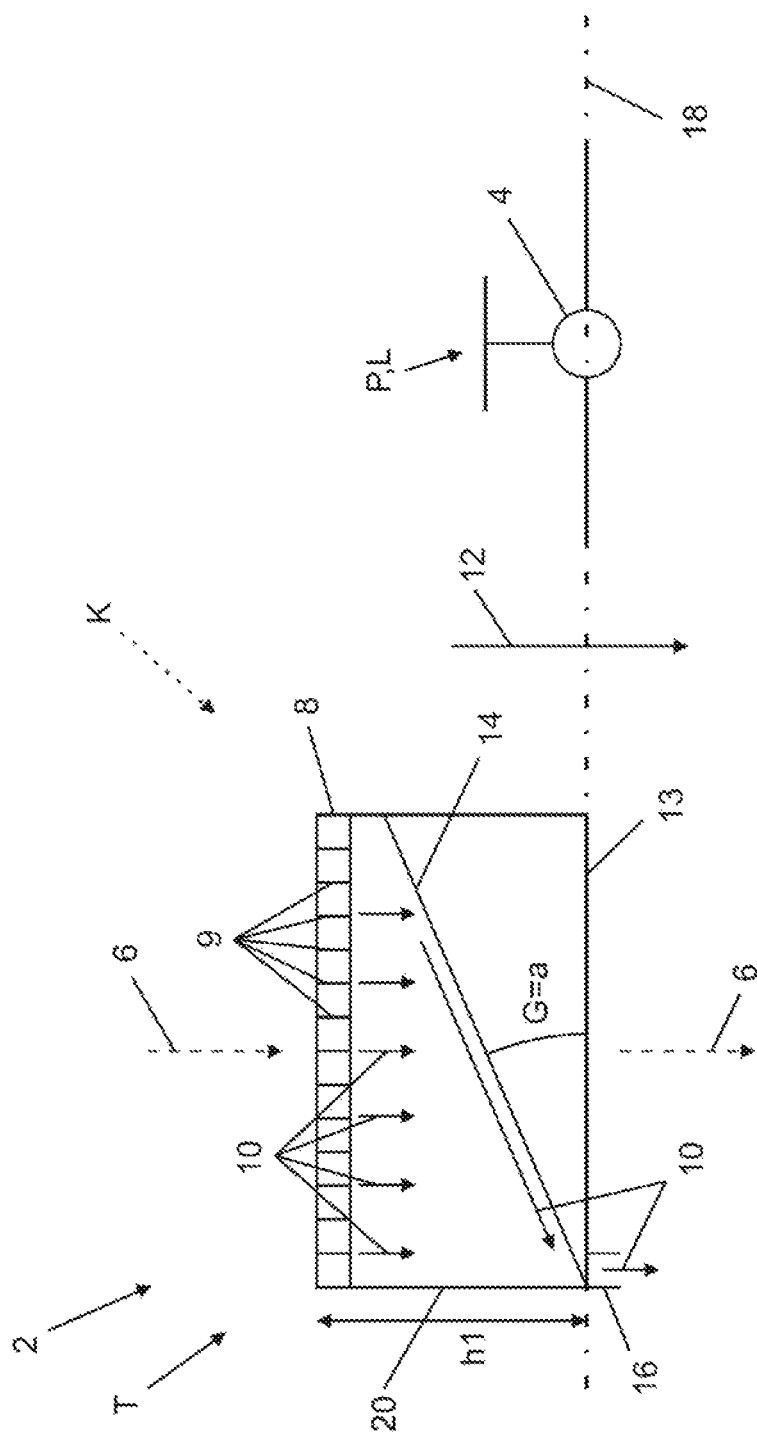
FIG. 1 is a fragmentary, diagrammatic, elevational view of a cooling unit according to the prior art when an aircraft is flying straight-ahead.

Referring now to the figures of the drawings in detail and first, particularly, to FIG. 1 thereof, there is seen a fragmentary view of a conventional prior art cooling unit 2 of an aircraft 4 including a galley area. The aircraft 4 is illustrated symbolically next to the cooling unit 2, in such a way that the current position in space of the cooling unit 2 coincides in the illustration with the illustrated position in space of the aircraft 4. The aircraft 4 is flying straight-ahead and is aligned parallel to a horizontal 18 or horizontal plane. The horizontal extends transversely to the direction of the gravitational force 12 (indicated by an arrow).

The cooling unit 2 can be operated in a cooling mode K (which is only indicated by a dashed arrow in the figure). In the cooling mode K, air 6 is fed to the cooling unit 2 (indicated by a dashed arrow). In the cooling unit 2, the air 6 flows through a heat exchanger 8 and is cooled there, to a temperature below zero degrees Celsius in the example. The cooled air 6 then leaves the cooling unit 2 in the form of a cold air flow, once again indicated by a dashed arrow.

Due to the cooling of the air 6 to below zero degrees Celsius in the heat exchanger 8, atmospheric moisture contained in the inflowing air 6 condenses on the heat exchanger. The condensed atmospheric moisture settles on the heat exchanger 8 in the form of ice. The available flow cross section in the heat exchanger 8 (between cooling fins 9) for the air 6 decreases gradually, impairing the cooling capacity and effectiveness of the cooling unit 2.

The air 6 flows along the cooling fins 9 (which are not further explained) of the heat exchanger 8 for the purpose of cooling. In this case, the heat exchanger 8 is embodied as a heat exchanger 8 of a non-illustrated compression-type refrigeration system, using an evaporator fin geometry (which is not further explained). The corresponding fin geometry of the heat exchanger (the heat exchanger 8) is the location of ice formation.

The cooling unit 2 can therefore also be operated in a thawing mode T. In this mode, the heat exchanger 8 is actively heated, with the result that the ice situated therein melts and drips off the heat exchanger 8 as thawed water 10, symbolized by solid arrows, in the direction of the gravitational force 12 (likewise indicated by an arrow).

The cooling unit 2 has a collecting channel 14. The collecting channel 14 is also referred to as a drainage duct. The thawed water 10 impinges upon the collecting channel 14 and is drained away through the channel, in this case towards a drainage port 16. The flow direction of the thawed water 10 is indicated by solid arrows. In order to bring about drainage of the thawed water 10 towards the drainage port 16 on the collecting channel 14 under the action of the gravitational force 12, the collecting channel 14 slopes relative to the horizontal 18 by a current slope angle G. In this configuration, the collecting channel 14 has a structural angle a relative to a base surface 13 of the cooling unit 2. When the aircraft 4 is aligned in the horizontal 18, the base surface 13 is likewise aligned horizontally.

The cooling unit 2 has an air duct 20, which guides the air 6 through the cooling unit 2 and past the collecting channel 14. According to the prior art, the structural angle a is dimensioned according to a specified maximum inclination angle of the aircraft in flight. This means that in all intended flight situations of the aircraft 4 no inclination angles greater than the angle a occur. In order to ensure that a current slope angle G greater than 0 of the collecting channel 14 relative to the gravitational force 12 pertains in each such flight situation, the angle a is therefore chosen as the structural angle of the collecting channel 14 in the cooling unit 2.

The specified geometry (cross section or width) of the air duct 20 thus results in a minimum structural height h1 for the cooling unit 2 which cannot be undershot in order to allow the angle a for a collecting channel 14 providing guidance over the entire width. The construction height h1 is thus the height of the overall module including the heat exchanger 8 with the integrated drainage duct, i.e. the collecting channel 14 in the air duct 20.

Figure 2:
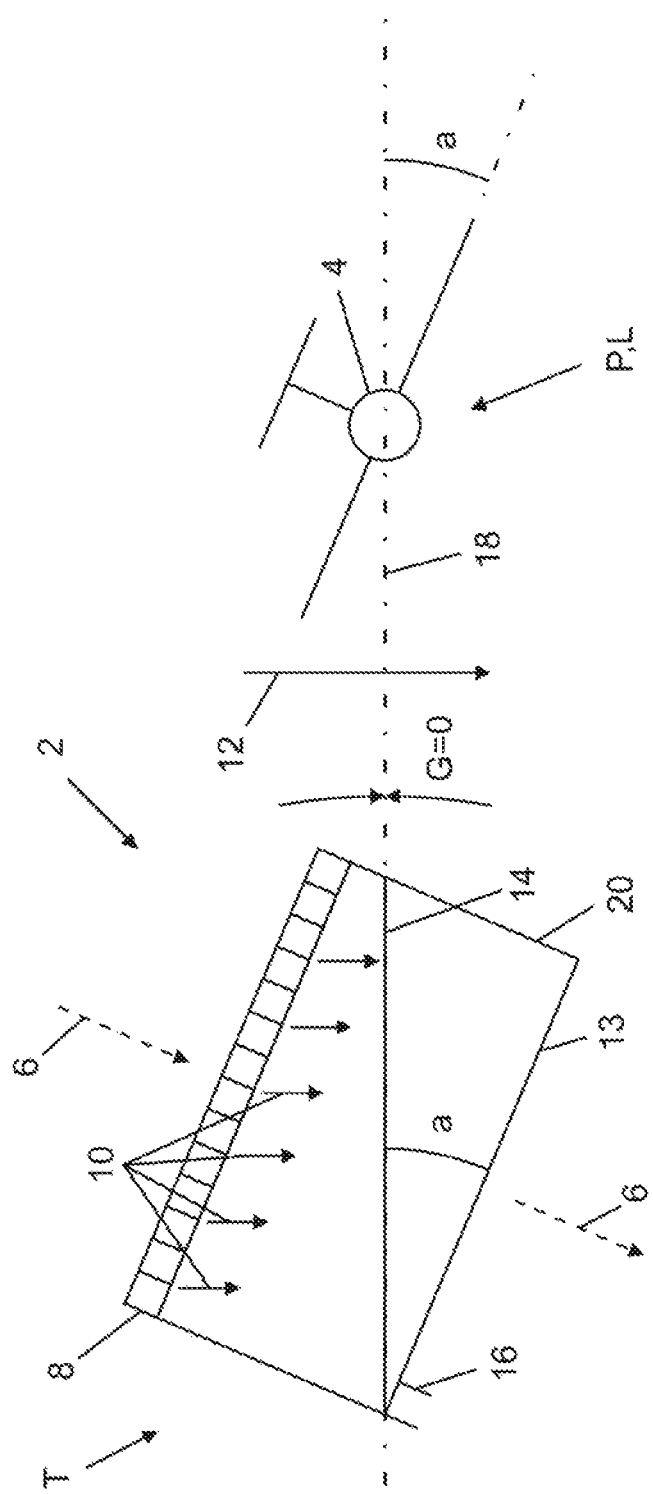
FIG. 2 shows the cooling unit of FIG. 1 when the aircraft is in an oblique position.

FIG. 2 shows a limit situation for the configuration of FIG. 1 when the aircraft 4 is in a flight attitude with an inclination angle a (in this case the roll angle) relative to the horizontal plane 18. Due to the installation of the cooling unit 2 in a fixed position relative to the aircraft 4, it is now tilted by the corresponding angle a. This results in the collecting channel 14 being aligned in the horizontal plane 18, i.e. the slope angle G between the collecting channel 14 and the horizontal plane 18 becomes zero. Due to the inclination angle a of the aircraft 4, it is no longer possible for the thawed water 10 to flow off through the collecting channel 14 to the drainage port 16 with the aid of the gravitational force 12.

FIGS. 1 and 2 show how thawed water 10 is supposed to be prevented in a conventional manner from continuing to flow off: the selected angle a in the cooling unit 2 is constructed to be such that the aircraft only ever assumes flight angles less than the angle a in the regular flying mode (according to predetermined limit values, regulations, etc.). At the specified structural angle a, the minimum construction height h1 of the cooling unit 2 is then obtained with a specified cross section of the air duct 20.

Figure 3:
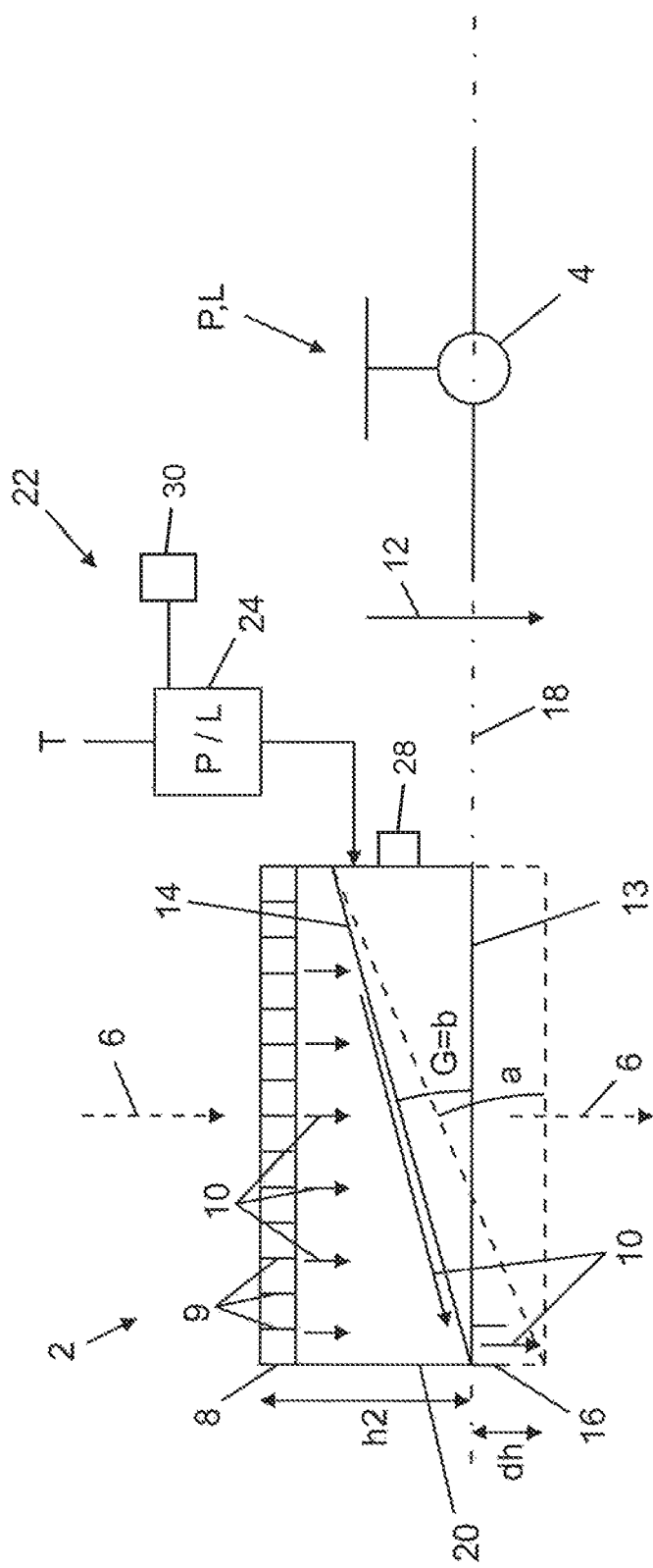
FIG. 3 shows a cooling unit according to the invention during straight-ahead flight.

FIG. 3 shows an embodiment of the cooling unit 2 according to the invention. The cooling unit 2 corresponds substantially to the cooling unit 2 according to FIGS. 1 and 2 but the structural angle of incidence of the collecting channel 14 is modified from the angle a to a smaller angle b. For comparison, the cooling unit 2 of FIGS. 1 and 2 is illustrated again in dashed lines. With otherwise the same geometry of the air duct 20, a structural height h2, which is less than the construction height h1 by a difference dh, is sufficient to enable the collecting channel to be disposed at the structural angle b. As in FIG. 1, the aircraft 4 is once again level in FIG. 3, i.e. aligned parallel to the horizontal 18. Thawed water 10 can run off to the drainage port 16 in the thawing mode T through the action of the gravitational force 12 or with the aid thereof.

According to the invention, the cooling unit 2 according to FIG. 3 is part of a cooling unit configuration 22 which, apart from the cooling unit 2, furthermore contains a control device 24. This is constructed or set up to prevent the thawing mode T during specifiable flight phases P and/or flight attitudes L. In the example, these are therefore all of the flight phases P and the flight attitudes L in which the aircraft 4 is at an inclination angle (roll angle) beyond the angle b. In this case, the flight phases P are "turn to the left onto a new heading." The flight attitude L includes roll angles beyond the angle b.

In the example, the control device 24 is therefore constructed to prevent the thawing mode T beyond a roll angle b, depending on the roll angle of the aircraft 4. Specifically, the thawing mode T is prevented for positive roll angles greater than or equal to the angle b. A flight attitude sensor 28 is disposed on the cooling unit 2 in a fixed position relative to the collecting channel 14. The flight attitude sensor 28 is used to determine the flight attitude L. An interface 30 can access flight attitude data that is available in the aircraft 4. The flight attitude L can be determined from the interface 30.

Figure 4:
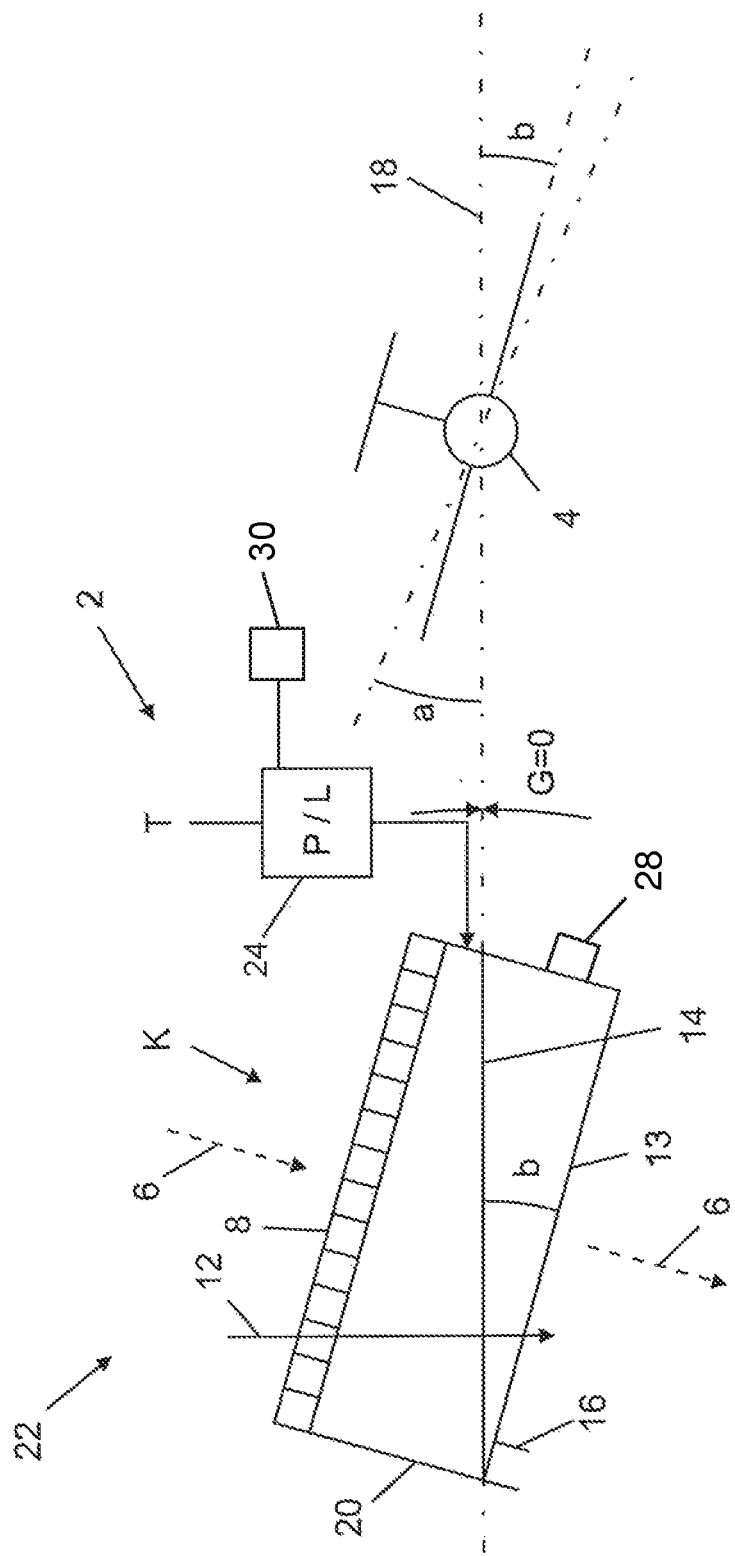
FIG. 4 shows the cooling unit of FIG. 3 when the aircraft is in an oblique position.

According to FIG. 4, the situation according to FIG. 2 arises, when the roll angle b is reached, that thawed water 10 might no longer be able to flow through the collecting channel 14 to the drainage port 16 with the aid of the gravitational force 12. FIG. 4 shows the case corresponding to FIG. 2 where the aircraft is inclined at the angle b relative to the horizontal 18. From this inclination (roll angle) onwards, thawed water 10 can no longer run off through the collecting channel 14 since the slope angle G becomes zero. In this case, therefore, it should be possible for the aircraft to adopt only relatively small inclination angles b (smaller than angle a according to FIG. 2) to always ensure that thawed water 10 runs off. In regular operation, however, inclination angles of the aircraft 4 up to the angle a are allowed. According to the invention, therefore, the thawing mode T—which would be active at this precise moment in this case according to the cycle—is prevented for inclination angles of the aircraft 4 beyond the angle b, as is illustrated in this case. The cooling unit 2 therefore continues to be in the cooling mode K. In the example, the structural angle b is chosen so that it is normally not reached in the flight phases P of "starting," "ascent," "cruising," "descent," "landing" and "turning to the right onto a new heading." In this case, the aircraft normally adopts only roll angles less than the angle b. The thawing mode T is therefore suppressed only in a small number of flight phases P and flight attitudes L, something that in practice is virtually insignificant and thus only imperceptibly impairs the cooling performance of the cooling unit 2. In particular, the defrost process or thawing mode T is continued as soon as the aircraft inclination angle is once again less than the angle b.

Figure 5:
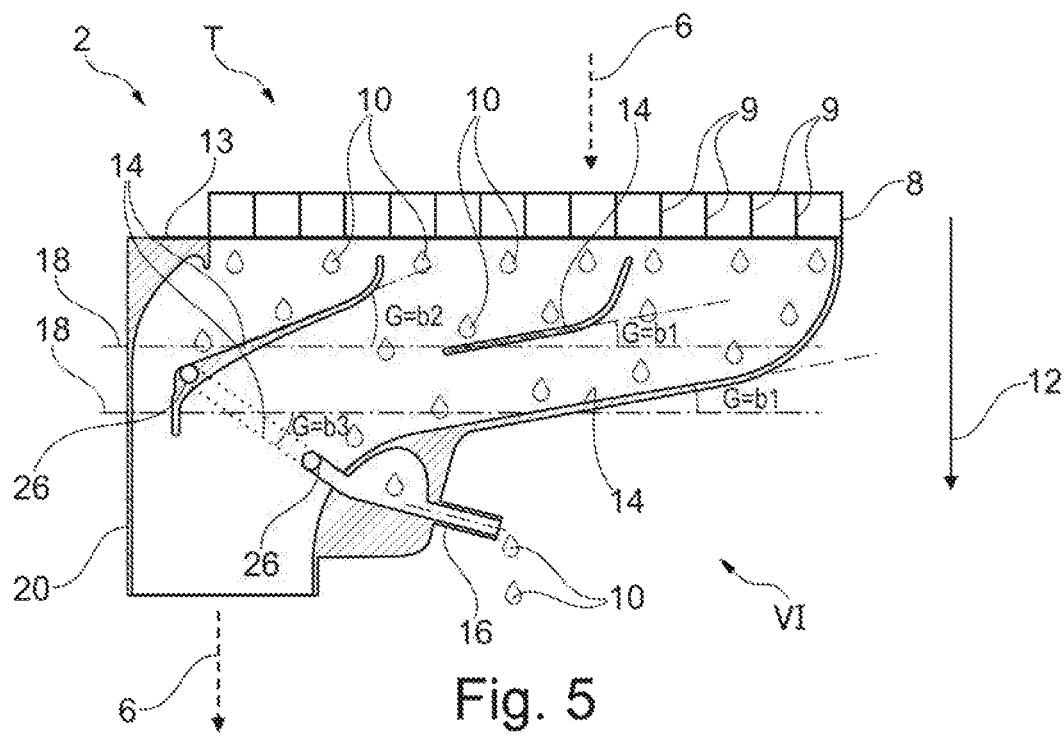
FIG. 5 is a sectional view of an air duct of a cooling unit.
Figure 6:
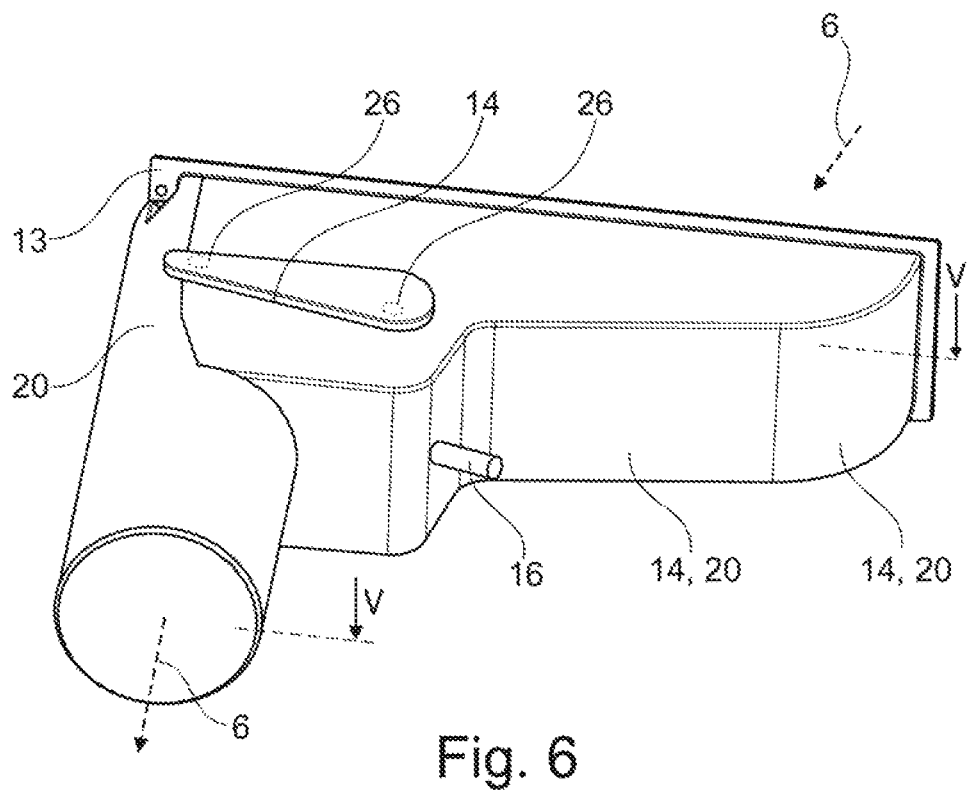
FIG. 6 is a perspective view of the air duct of FIG. 5.

In contrast to the symbolic illustration shown in FIGS. 1 to 4, FIG. 5 shows a concrete embodiment of an air duct 20 with a mounted heat exchanger 8. FIG. 6 is a perspective view of the cooling unit 2 of FIG. 5 taken in the direction of an arrow VI. FIG. 5 shows a section through FIG. 6 taken along a line V-V. In this case, the thawed water 10 is illustrated symbolically in the form of thawed droplets. The heat exchanger 8 has been omitted from FIG. 6.

In this case, the collecting channel 14 has a multi-part construction, or there is a plurality of collecting channels 14. These collecting channels 14 have different angles relative to the horizontal 18 and also different alignments. The collecting channels 14 lead to through openings 26 through walls of the air duct 20. All of the collecting channels 14 ultimately come together again at the drainage port 16. In this case, the control device 24 makes reference to the smallest inclination angle of the collecting channels 14, in the example the inclination angle b1. The angles b2 and b3 (negative), in contrast, are each chosen so that the magnitude thereof is greater than that of the angle b1, with the result that reliable discharge of the thawed water 10 on all of the collecting channels 14 with the aid of the gravitational force 12 is made possible in all situations or alignments of the cooling unit 2 in which the thawing mode T (magnitude of the slope angle G is less than the angle b1) is not suppressed.

For the case according to the invention of an inclination (structural angle b, b1) of the collecting channel 14 that is reduced in principle relative to the horizontal 18 (slope angle in the basic position), the general separation capacity may fall, i.e. the possibility of discharging a certain quantity of thawed water 10 from the cooling unit 2 in a certain time with the aid of the gravitational force 12. In the example, therefore, a respective cycle time for the thawing mode T is generally limited to ensure that not too much condensate in the form of thawed water 10 arises in each thawing mode cycle. In addition, a limit value in the form of a coating thickness of ice on the heat exchanger 8 is defined in order to trigger a thawing mode T. Thus, this mode can be carried out not only under time control at regular time intervals but also in response to a measured coating thickness of ice.

The following is a summary list of reference numerals and the corresponding structure used in the above description of the invention:

2 cooling unit
4 aircraft
6 air
8 heat exchanger
9 cooling fin
10 thawed water
12 gravitational force
13 base surface
14 collecting channel
16 drainage port
18 horizontal
20 air duct
22 cooling unit configuration
24 control device
26 through opening
28 flight attitude sensor
30 interface
K cooling mode
T thawing mode
G slope angle (current)
a, b angle (structural)
h1,2 construction height
dh difference
P flight phase
L flight attitude

The invention claimed is:

1. A method for operating a cooler on board an aircraft, the method comprising the following steps:
   selectively operating the cooler in a cooling mode and in a thawing mode;
   draining off any thawed water in the cooler from a heat exchanger with the aid of gravitational force in the thawing mode through a collecting channel having a current slope angle relative to the horizontal;
   suppressing the thawing mode when the current slope angle falls below a minimum angle; and
   preventing the thawing mode during at least one of flight phases or flight attitudes of the aircraft.

2. The method according to claim 1, which further comprises:
   guiding air through the heat exchanger in the cooler and cooling the air in the heat exchanger, in the cooling mode; and
   thawing the heat exchanger in the thawing mode.

3. The method according to claim 2, which further comprises:
   using the cooler to supply the air as a cold air flow at a temperature below 0° C. downstream of the heat exchanger in the cooling mode; and
   deicing the heat exchanger with a formation of the thawed water, in the thawing mode.

4. The method according to claim 1, which further comprises orienting the collecting channel in a fixed position relative to the aircraft, and determining the current slope angle from the flight attitude of the aircraft.

5. The method according to claim 4, which further comprises using a flight attitude sensor disposed on the cooler in a fixed position relative to the collecting channel to determine the flight attitude.

6. The method according to claim 1, which further comprises preventing the thawing mode when at least one of a roll or a pitch or a yaw angle of the flight attitude exceeds a limit value.

7. The method according to claim 1, which further comprises determining the flight attitude from flight attitude data available in the aircraft.

8. The method according to claim 1, which further comprises operating the cooler in the thawing mode at intervals in accordance with deicing cycles.

9. The method according to claim 1, which further comprises operating the cooler in a galley area of the aircraft for cooling purposes.

10. A cooler configuration for an aircraft, the cooler configuration comprising:

a cooler to be mounted on board the aircraft, said cooler being operable in a cooling mode and in a thawing mode;

said cooler having a heat exchanger operable in said thawing mode and permitting any thawed water to be drained off from said heat exchanger with the aid of gravitational force;

said cooler having a collecting channel having a current slope angle relative to the horizontal, said collecting channel permitting the thawed water to be drained off through said collecting channel with the aid of the gravitational force; and said cooler configured to be prevented from operating in said thawing mode during at least one of flight phases or flight attitudes of the aircraft and said cooler configured to suppress said thawing mode when said current slope angle falls below a minimum angle.

11. The cooler configuration according to claim 10, wherein:

said collecting channel is disposed in a fixed position relative to the aircraft;

said current slope angle is determined from the flight attitude of the aircraft; and a flight attitude sensor is disposed on said cooler in a fixed position relative to said collecting channel, said flight attitude sensor being used to determine the flight attitude.

12. The cooler configuration according to claim 10, which further comprises an interface with flight attitude data being available in the aircraft, the flight attitude being determinable from said interface.

13. The cooler configuration according to claim 10, wherein the cooler is configured to be disposed in an aircraft galley area.

* * * * *